(12) United States Patent
Gless

(10) Patent No.: US 9,636,625 B2
(45) Date of Patent: May 2, 2017

(54) DRYING DEVICE AND BATTERY SYSTEM AND MOTOR VEHICLE HAVING SAID DRYING DEVICE

(75) Inventor: Michael Gless, Stuttgart-Zazenhausen (DE)

(73) Assignees: Robert Bosch GmbH, Stuttgart (DE); Samsung SDI Co., Ltd., Yongin-si, Gyeonggi-do (KR)

(*) Notice: Subject to any disclaimer, the term of this patent is extended or adjusted under 35 U.S.C. 154(b) by 457 days.

(21) Appl. No.: 14/125,387

(22) PCT Filed: Jun. 4, 2012

(86) PCT No.: PCT/EP2012/060493
§ 371 (c)(1),
(2), (4) Date: Mar. 28, 2014

(87) PCT Pub. No.: WO2012/171822
PCT Pub. Date: Dec. 20, 2012

(65) Prior Publication Data
US 2014/0199566 A1    Jul. 17, 2014

(30) Foreign Application Priority Data
Jun. 14, 2011    (DE) .................. 10 2011 077 489

(51) Int. Cl.
*H01M 10/50*    (2006.01)
*B01D 53/04*    (2006.01)
(Continued)

(52) U.S. Cl.
CPC ....... *B01D 53/0415* (2013.01); *B01D 53/261* (2013.01); *H01M 2/10* (2013.01);
(Continued)

(58) Field of Classification Search
None
See application file for complete search history.

(56) References Cited

U.S. PATENT DOCUMENTS

2003/0170535 A1* 9/2003 Watanabe ........... H01M 2/0207
429/158
2009/0060751 A1* 3/2009 Bourell, Jr. ......... F04D 15/0218
417/36
(Continued)

FOREIGN PATENT DOCUMENTS

CN    1184063 A    6/1998
CN    1378636 A    11/2002
(Continued)

OTHER PUBLICATIONS

English translation of DE 102008034698 A1.*
(Continued)

*Primary Examiner* — Scott J Chmielecki
(74) *Attorney, Agent, or Firm* — Maginot, Moore & Beck LLP

(57) ABSTRACT

A drying device includes a desiccant cartridge having a desiccant to reduce a moisture content of a gas located in an inner chamber of a housing. The drying device has a protective chamber which is configured to be introduced into the housing in a liquid-tight manner with respect to the inner chamber and which is connected to the internal space in a gas-conducting manner. The desiccant cartridge is arranged in the protective chamber. A battery system includes the drying device and a motor vehicle includes the battery system.

18 Claims, 3 Drawing Sheets

(51) Int. Cl.
*H01M 2/10* (2006.01)
*H01M 2/32* (2006.01)
*B01D 53/26* (2006.01)
*H01M 10/613* (2014.01)

(52) U.S. Cl.
CPC ........... *H01M 2/1094* (2013.01); *H01M 2/32* (2013.01); *B01D 2259/4566* (2013.01); *H01M 10/613* (2015.04)

(56) References Cited

U.S. PATENT DOCUMENTS

| | | | | |
|---|---|---|---|---|
| 2009/0301127 | A1* | 12/2009 | Kaufman | F25B 17/083 62/480 |
| 2010/0043462 | A1* | 2/2010 | Barot | F25B 17/083 62/112 |
| 2010/0276442 | A1* | 11/2010 | Querfurth | F25D 23/12 222/1 |
| 2011/0016902 | A1* | 1/2011 | Eisenhour | B60H 3/024 62/271 |
| 2012/0006697 | A1* | 1/2012 | Portier | B65D 23/02 206/204 |
| 2013/0252043 | A1* | 9/2013 | Allison | H01M 2/1077 429/72 |

FOREIGN PATENT DOCUMENTS

| | | | | |
|---|---|---|---|---|
| DE | 102 61 873 | A1 | 7/2003 | |
| DE | 10 2008 034 698 | A1 | 6/2009 | |
| DE | 102008034698 | A1 * | 6/2009 | ........... B01D 53/261 |
| DE | 10 2009 034 959 | A1 | 2/2011 | |
| DE | 10 2010 028 861 | A1 | 11/2011 | |
| EP | 0 831 033 | A1 | 3/1998 | |

OTHER PUBLICATIONS

International Search Report corresponding to PCT Application No. PCT/EP2012/060493, mailed Sep. 10, 2012 (German and English language document) (7 pages).

* cited by examiner

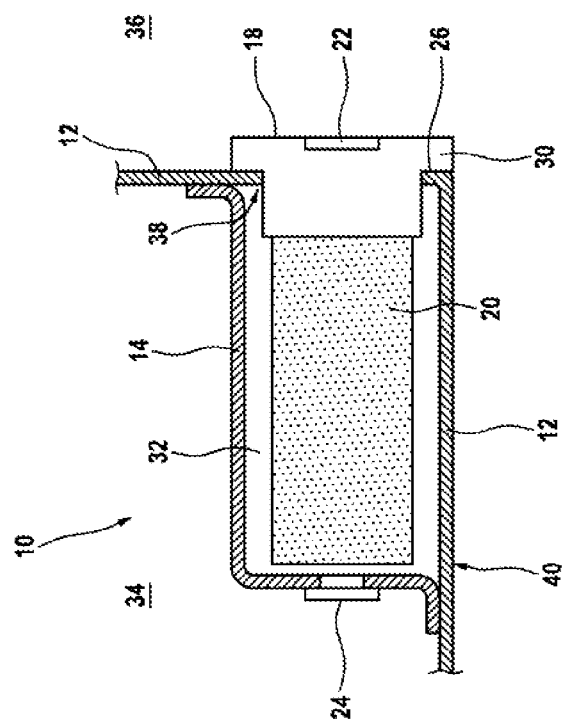
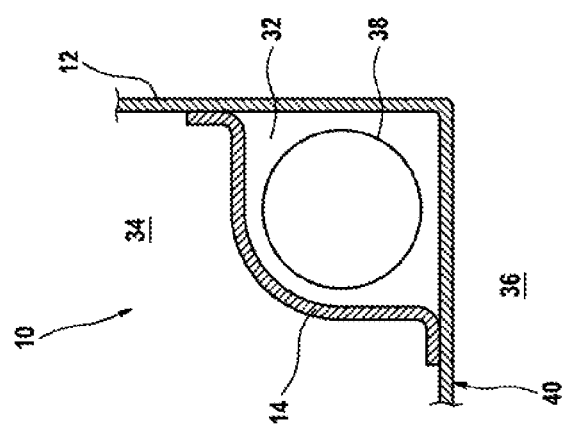

DRYING DEVICE AND BATTERY SYSTEM AND MOTOR VEHICLE HAVING SAID DRYING DEVICE

This application is a 35 U.S.C. §371 National Stage Application of PCT/EP2012/060493, filed on Jun. 4, 2012, which claims the benefit of priority to Serial No. DE 10 2011 077 489.0, filed on Jun. 14, 2011 in Germany, the disclosures of which are incorporated herein by reference in their entirety.

BACKGROUND

The present disclosure relates to a drying device for reducing a moisture content of a gas present in an internal space of a housing, having a desiccant cartridge comprising a desiccant. In addition, a battery system and a motor vehicle having said drying device are provided.

In order to ensure the safety of battery systems, in particular lithium-ion battery systems, and to optimize the energy and performance parameters and the service life, the battery cells of the battery system are preferably operated within a defined temperature range. It is necessary, especially in the case of a high power input/output, to avoid heating of the battery cells above a specific operating temperature and to dissipate the heat occurring in operation. Cooling systems are generally used for this purpose.

In addition, it may also be necessary to heat battery cells that are too cool to a required operating temperature. A temperature control system may also be used for this purpose. To achieve the required operating temperature it is therefore preferable to use a unit which will serve both to supply heat and to dissipate heat.

Air or water is generally used as medium for cooling the battery cells, wherein the respective medium absorbs the heat and removes it from the cells. Aqueous cooling media are often led through a base plate, which is thermally connected to the battery cells, for example by way of metal sheets. When air is used as cooling medium, this is fed through between the cells. Air cooling, in particular, necessitates a relatively large preparatory outlay for dehumidification and filtering of the cooling air, and feeding the flow through the housing to the battery cells. In the case of a water-cooled battery system the particular problem arising is that of condensate forming inside the housing.

One known solution, in order to reduce the moisture or condensate accumulating in the housing, is to dry the air present in the housing by means of a desiccant.

To do this, corresponding precautions have to be taken, such as positioning the desiccant at a suitable location in the housing, for example. For this purpose the previously unpublished application DE 10 2010 028 861 shows a drying device in a housing internal space, in particular a battery housing internal space, wherein the drying device comprises a desiccant body and a fixing device for positively and/or non-positive fixing of the desiccant body, which serves for positioning the desiccant body in the housing internal space or positioning it so as to form at least a part of the inner surface of the housing.

SUMMARY

According to disclosure a drying device is provided, which comprises a desiccant cartridge having a desiccant in order to reduce a moisture content of a gas present in an internal space of a housing. Here the drying device comprises a protective chamber, which is or which can be introduced into the housing so that it is liquid-tight in relation to the internal space and has a gas-conducting connection to the internal space, and in which the desiccant cartridge is arranged.

This advantageously allows the desiccant to be replaced whilst maintaining the tightness or the protection class (protection against electric shock) of the housing, since on removing the desiccant cartridge only the safety chamber is accessible from the surroundings, but not the actual internal space of the housing. This advantageously precludes the possibility of foreign bodies getting into the internal space of the housing. Any contact with components in the internal space of the housing can thus be prevented.

Replacing the desiccant carries relatively little risk. The internal space of the housing remains closed and protected from contact even whilst replacing the desiccant cartridge. This characteristic proves especially advantageous in the case of battery systems having live components in the internal space of the housing.

Since replacing the desiccant required specially trained personnel, it was hitherto usual to maintain an excess quantity of desiccant in drying devices, so that service intervals could be widely spaced. The drying device according to the disclosure allows easy and risk-free replacement of the desiccant. Specially trained personnel are not necessary. With the drying device according to the disclosure it is therefore advantageously possible to use a smaller quantity of desiccant in the drying device than has hitherto been usual. It is thereby possible to reduce the weight and costs. Moreover, the replaceable quantity of desiccant can be varied and can be easily adapted to the particular requirements of the operational area.

In a preferred embodiment of the drying device according to the disclosure the protective chamber comprises a pressure-equalizing element, in particular a pressure-equalizing element having a watertight and breathable diaphragm.

Pressure-equalizing elements are standard components. Arranging the pressure-equalizing element in the drying device advantageously affords a simple and cost-effective facility for producing pressure equalization between the internal space and the protective chamber.

In a further preferred embodiment of the drying device according to the disclosure a protective cover arranged in the housing on a housing outer wall and the housing outer wall form the protective chamber, and the pressure-equalizing element is arranged in the protective cover.

In this embodiment the protective chamber of the drying device is partly formed by the housing outer wall. This obviates the need, for this part, to use additional material for producing the protective chamber, thereby bringing advantageous savings in material and weight.

Alternatively, in another preferred embodiment of the drying device according to the disclosure a protective sleeve, which is or which can be introduced into the housing through a housing aperture of a housing outer wall, forms the protective chamber, and the pressure-equalizing element is arranged in the protective sleeve. At the same time it is proposed, in particular, that the protective sleeve should have an external thread and be capable of being screwed into the housing.

This advantageously affords the facility for retrofitting the drying device according to the disclosure to all housings. To do this the protective sleeve only has to be introduced into the housing at a suitable point. The protective sleeve can advantageously be fixed rapidly and securely by means of the external thread.

In a further preferred embodiment of the drying device according to the disclosure the drying device comprises a sensor unit for detecting an absorption capacity of the desiccant. Here the sensor unit preferably comprises a display having an appearance that varies as a function of the absorption capacity of the desiccant. In particular the sensor unit comprises an electronic sensor, which can be connected to an electronic management system, for example a battery management system.

It is thereby advantageously possible to monitor the degree of saturation or the absorption capacity of the desiccant and to signal the need for replacement of the desiccant cartridge in good time. Furthermore, defects or damage to the protective housing, for example, which can lead to an ingress of liquid into the closed battery system, can be detected and advance warning given in good time before critical states occur.

In all embodiments mentioned the drying device according to the disclosure is preferably incorporated in a battery system. For this purpose the battery system according to the disclosure comprises a housing and an internal space substantially enclosed by the housing. Here the drying device is introduced into the housing. The battery system preferably comprises lithium-ion cells as battery cells.

It is precisely in battery systems that the advantages of the drying device according to the disclosure assume importance, since here live components susceptible to moisture are arranged in the internal space of the housing.

According to the disclosure a motor vehicle is furthermore provided having the battery system according to the disclosure in the aforementioned embodiments, wherein the battery system is connected to a propulsion system of the motor vehicle. The advantages of the battery system according to the disclosure as a component therefore also benefit the motor vehicle as an assembly.

Advantageous developments of the disclosure are specified in the dependent claims and are explained in the description.

In this application the term battery system also encompasses batteries, battery modules, other battery sub-units, accumulators, storage batteries, storage battery systems, in particular lithium-ion systems or lithium-polymer ion systems.

BRIEF DESCRIPTION OF THE DRAWINGS

The present disclosure is explained in more detail with reference to the drawings and the following description. In the drawings:

FIG. 1 shows a front view of a first embodiment of a drying device according to the disclosure, FIG. 2 shows a side view of the first embodiment of the drying device according to the disclosure.

DETAILED DESCRIPTION

Figure 3:
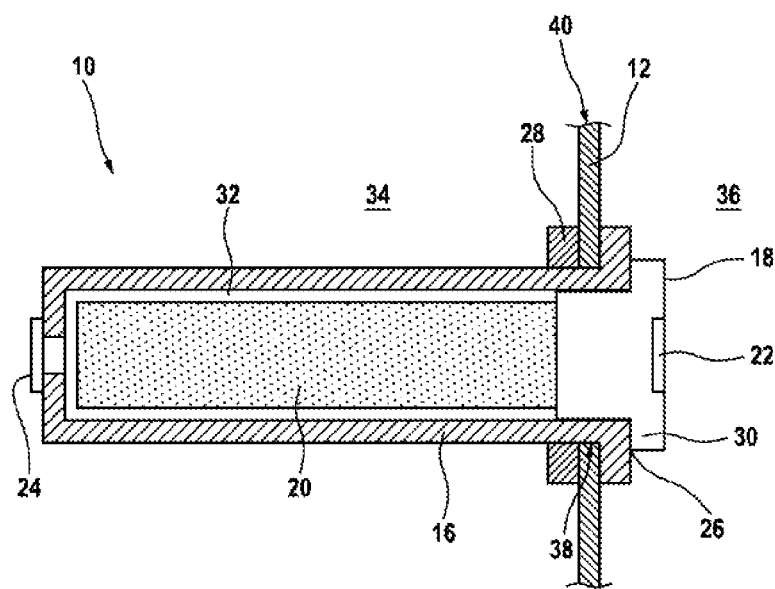
FIG. 3 shows a side view of a second embodiment of a drying device according to the disclosure.

FIGS. 1 and 2 by way of non-restrictive examples show sectional representations in sketch form of a first embodiment of a drying device 10 according to the disclosure, FIG. 1 being a front view and FIG. 2 a side view.

The drying device 10 here is accommodated in a housing 40. The housing 40 comprises a housing outer wall 12 dividing an internal space 34 off from the surroundings 36. The housing outer wall 12 substantially encloses the internal space 34 and seals this off from the surroundings 36. According to the disclosure this housing 40 is preferably the housing 40 of a battery system 42, in particular a lithium-ion battery system.

The drying device 10 here comprises a protective chamber 32, which forms a space separated from the internal space 34. The protective chamber 32 has a gas-permeable and liquid-tight connection to the internal space 34. In the first exemplary design variant, shown in FIGS. 1 and 2, the protective chamber 32 is formed by a protective cover 14, which at least partially encloses the protective chamber 32. The protective cover 14 is arranged on the side of the housing outer wall 12 facing the internal space 34. The protective cover 14 is preferably firmly connected to the housing outer wall 12 by a cohesive material joint. The housing outer wall 12 likewise preferably encloses at least a part of the protective chamber 32. The protective chamber 32 is thus divided off from the surroundings 36 by the housing outer wall 12. In the first design variant according to FIGS. 1 and 2 there is scope for providing the protective chamber 32 at an edge of the housing 40.

According to the disclosure the protective chamber 32 and the internal space 34 preferably have a gas-conducting connection to one another by way of a pressure-equalizing element, 24, in particular a pressure-equalizing element 24 which comprises a watertight and breathable diaphragm. In the first design variant the pressure-equalizing element 24 is arranged in the protective cover 14.

Pressure-equalizing elements are known. They serve for ventilating and venting sealed housings 40, in order to avoid pressure differentials between the internal space 34 enclosed by the housing 40 and the surroundings 36 of the housing 40, and to prevent the formation of condensate in the internal space 34.

In the present disclosure pressure equalization does not take place directly between the internal space 34 and the surroundings 36, but firstly between the internal space 36 and the protective chamber 32 and secondly between protective chamber 32 and the surroundings 36. For this purpose the protective chamber 32 has a pressure-equalizing connection both to the internal space 34 and to the surroundings 36.

According to the disclosure a desiccant cartridge 18, which contains a desiccant 20, is arranged in the protective chamber 32. A silica gel or a molecular sieve, preferably in the form of a moisture absorbent according to DIN 55473, is preferably provided as desiccant.

The desiccant cartridge 18 is arranged so that it can be replaced. It can be introduced into the protective chamber 32 through a housing aperture 38 in the housing outer wall 12. The desiccant cartridge 18 comprises at least one breathing aperture 26, which is preferably arranged behind a collar 30, in order to protect it from the ingress of dust and moisture. Through at least this one breathing aperture 26 the protective chamber has a pressure-equalizing connection to the surroundings.

As air flows pass through the safety chamber 32, they penetrate the desiccant cartridge 18. Arranged in the desiccant cartridge 18 is a desiccant 20, which extracts moisture fraction from the air flowing through by binding these to it. Here both the air flowing out of the surroundings 36 into the internal space 34 and the air flowing from the internal space 34 into the surroundings 36 are dehumidified and dried.

The drying device 10 according to the disclosure preferably comprises a sensor unit 22 for detecting an absorption capacity of the desiccant 20. Here the sensor unit 22 preferably comprises a display, which has an appearance that varies as a function of the absorption capacity of the desiccant 20. For example the display changes color. In addition, the sensor unit 22 comprises an electronic sensor, which can be connected to an electronic management system. This management system is preferably a battery management system of a battery system 42.

FIG. 3, by way of a non-restrictive example, shows a sectional sketch representation of a second embodiment of a drying device 10 according to the disclosure in a side view.

In contrast to the first embodiment, the protective chamber 32 in this second embodiment is formed by a protective sleeve 16, which at least partially encloses the protective chamber 32. The protective sleeve 16 divides the protective chamber 32 off from the internal space 34. The protective sleeve 16 can preferably be introduced, in particular screwed into the housing 40 from the surroundings 36. For this purpose the protective sleeve 16 is preferably provided with an external thread, which produces a non-positive and frictional connection with a corresponding internal thread in the housing aperture 38 or a seal 28. Alternatively, plug-and-socket connections or cohesive material joint connections are also possible. The seal 28 is arranged on the side of the housing outer wall 12 facing the internal space 34 and serves for sealing the housing aperture 38.

Figure 4:
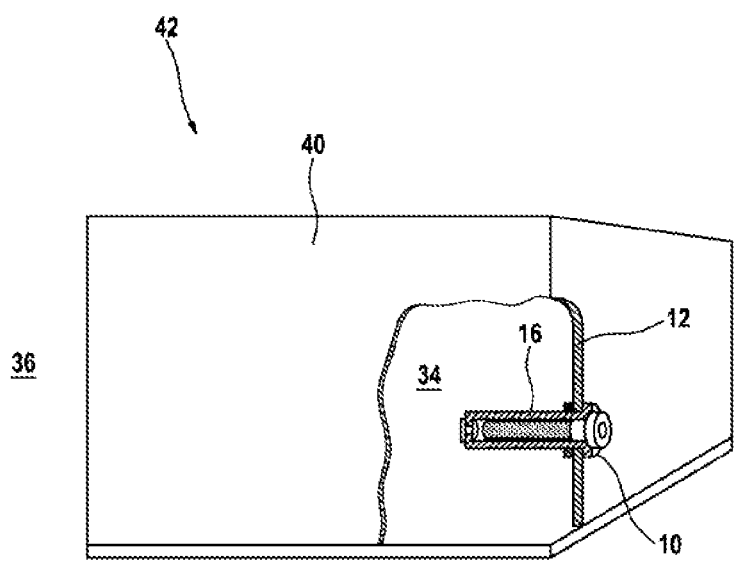
FIG. 4 shows a battery system according to the disclosure having the drying device.

FIG. 4, by way of a non-restrictive example, shows a sectional sketch representation of a battery system 42 according to the disclosure, having the drying device 10. The drying device 10 here comprises a protective chamber 32, which is formed by a protective sleeve 16 in the internal space 34 of the housing 12, corresponding to the second design variant of the present disclosure.

The invention claimed is:

1. A battery system, comprising:
   a housing and an internal space substantially enclosed by the housing; and
   a drying device introduced into the housing, the drying device including:
     a desiccant cartridge comprising a desiccant; and
     a wall at least in part defining a protective chamber arranged in the housing,
     wherein the protective chamber (i) is liquid-tight in relation to the internal space and (ii) has a first gas-conducting connection to the internal space, and
     wherein the desiccant cartridge is arranged in the protective chamber.

2. A motor vehicle, comprising:
   a propulsion system; and
   at least one battery system connected to the propulsion system of the motor vehicle, the battery system including:
     a housing and an internal space substantially enclosed by the housing; and
     a drying device introduced into the housing, the drying device including:
       a desiccant cartridge comprising a desiccant; and
       a wall at least in part defining a protective chamber arranged in the housing,
       wherein the protective chamber (i) is liquid-tight in relation to the internal space and (ii) has a first gas-conducting connection to the internal space, and
       wherein the desiccant cartridge is arranged in the protective chamber.

3. The battery system as claimed in claim 1, wherein the first gas-conducting connection is configured as a first pressure-equalizing element.

4. The battery system as claimed in claim 3, wherein the wall is configured as a protective cover arranged in the housing on a housing outer wall of the housing, the protective cover and the housing outer wall forming the protective chamber, and wherein the first pressure-equalizing element is arranged in the protective cover.

5. The battery system as claimed in claim 3, wherein the wall is configured as a protective sleeve that forms the protective chamber, the protective sleeve configured to be inserted into the housing through a housing aperture defined by a housing outer wall of the housing, and wherein the first pressure-equalizing element is arranged in the protective sleeve.

6. The battery system as claimed in claim 5, wherein the protective sleeve has an external thread and is configured to be screwed into the housing.

7. The battery system as claimed in claim 1, wherein the drying device comprises a sensor unit configured to detect an absorption capacity of the desiccant.

8. The battery system as claimed in claim 7, wherein the sensor unit comprises a display having an appearance that varies as a function of the absorption capacity of the desiccant.

9. The battery system as claimed in claim 7, wherein the sensor unit comprises an electronic sensor configured to be connected to an electronic management system.

10. The battery system as claimed in claim 1, wherein the desiccant cartridge has a second gas-conducting connection to surroundings outside of the housing, the gas configured to follow one or more of a first flow path from the internal space, through the protective chamber, and to the surroundings and a second flow path from the surroundings, through the protective chamber, and to the internal space.

11. The battery system as claimed in claim 10, wherein the second gas-conducting connection is configured as a second pressure-equalizing element.

12. The motor vehicle as claimed in claim 2, wherein the first gas-conducting connection is configured as a first pressure-equalizing element.

13. The motor vehicle as claimed in claim 12, wherein the wall is configured as a protective cover arranged in the housing on a housing outer wall of the housing, the protective cover and the housing outer wall forming the protective chamber, and wherein the first pressure-equalizing element is arranged in the protective cover.

14. The motor vehicle as claimed in claim 12, wherein the wall is configured as a protective sleeve that forms the protective chamber, the protective sleeve configured to be inserted into the housing through a housing aperture defined by a housing outer wall of the housing, and wherein the first pressure-equalizing element is arranged in the protective sleeve.

15. The motor vehicle as claimed in claim 14, wherein the protective sleeve has an external thread and is configured to be screwed into the housing.

16. The motor vehicle as claimed in claim 2, wherein the drying device comprises a sensor unit configured to detect an absorption capacity of the desiccant.

17. The motor vehicle as claimed in claim 16, wherein the sensor unit comprises a display having an appearance that varies as a function of the absorption capacity of the desiccant.

18. The motor vehicle as claimed in claim 16, wherein the sensor unit comprises an electronic sensor configured to be connected to an electronic management system.

* * * * *